United States Patent
Li

(10) Patent No.: US 9,357,193 B2
(45) Date of Patent: May 31, 2016

(54) METHOD AND APPARATUS FOR COMPENSATING FOR COLOR IMBALANCE IN IMAGE DATA

(71) Applicant: Marvell World Trade Ltd., St. Michael (BB)

(72) Inventor: Huai Dong Li, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/580,536

(22) Filed: Dec. 23, 2014

(65) Prior Publication Data

US 2015/0195501 A1    Jul. 9, 2015

Related U.S. Application Data

(60) Provisional application No. 61/925,536, filed on Jan. 9, 2014.

(51) Int. Cl.
*H04N 9/73* (2006.01)
*H04N 9/64* (2006.01)
*H04N 9/04* (2006.01)

(52) U.S. Cl.
CPC ............... *H04N 9/735* (2013.01); *H04N 9/045* (2013.01); *H04N 9/646* (2013.01)

(58) Field of Classification Search
CPC ........ H04N 9/045; H04N 9/735; H04N 9/646
See application file for complete search history.

(56) References Cited

U.S. PATENT DOCUMENTS

| | | | | |
|---|---|---|---|---|
| 8,135,237 B2* | 3/2012 | Quan | .................... | G06T 3/4015 348/538 |
| 8,305,316 B2* | 11/2012 | Irie | ....................... | G09G 3/3648 345/87 |
| 8,314,863 B2* | 11/2012 | Tachi | ...................... | H04N 5/217 348/234 |
| 8,995,766 B1* | 3/2015 | Peng | ......................... | G06T 5/20 382/167 |
| 2008/0252759 A1* | 10/2008 | Jerdev | ..................... | H04N 9/045 348/273 |
| 2013/0050528 A1* | 2/2013 | Hsu | ........................ | H04N 9/045 348/234 |

FOREIGN PATENT DOCUMENTS

| | | |
|---|---|---|
| EP | 2 557 798 | 2/2013 |
| WO | WO02/075654 | 9/2002 |
| WO | WO-02/075654 A2 * | 9/2002 |

* cited by examiner

*Primary Examiner* — James Hannett

(57) ABSTRACT

A method of correcting color imbalance in a captured image includes deriving gradient data from a group of pixels in the captured image, determining a compensation value based on the gradient data, and applying that value to at least one pixel. Apparatus for correcting color imbalance includes a digital image processor that corrects color imbalance, in an image that is output by an image detector, according to the method. Each pixel may represent a color from a set of colors, with one particular color being a selected color, and each pixel to which the compensation value is applied representing the selected color. Where the group of pixels forms a rectangular shape, the gradient data may include horizontal and vertical gradients. The classifying may be performed according to a visual characteristic of a portion of the image, where determining the compensation value is based also on the visual characteristic.

16 Claims, 3 Drawing Sheets

METHOD AND APPARATUS FOR COMPENSATING FOR COLOR IMBALANCE IN IMAGE DATA

CROSS REFERENCE TO RELATED APPLICATION

This claims the benefit of commonly-assigned U.S. Provisional Patent Application No. 61/925,536, filed Jan. 9, 2014, which is hereby incorporated by reference herein in its entirety.

FIELD OF USE

This disclosure relates to the processing of color image data, and particularly still color image data, to reduce artifacts that arise as pixel sizes decrease.

BACKGROUND

Image capture devices in all areas of consumer electronics, including digital still and video cameras (including those incorporated in mobile telephones), PC cameras, automotive, surveillance, and other applications, acquire imagery using a charge-coupled device (CCD) or CMOS sensor, overlaid with a color filter array (CFA). In a standard red-green-blue (RGB) system, the color filter array is a mosaic of colored filters arranged so that each sensor pixel measures only one of the three primary colors (i.e., red, green, and blue). One common color filter array pattern is the Bayer CFA pattern which includes rows of alternating red and green pixels, interleaved with rows of alternating blue and green pixels. The red and blue pixels are arranged on rectangular lattices in their respective sets of rows, but those lattices are offset from one another. As a result, the green pixels, which are located in both sets of rows, are located on a quincunx lattice, with twice as many pixels as either the red or blue pixels. There are more green pixels in this color filter array pattern because the green spectral response is closer to the luminance response of human visual system, recording most of the spatial information that is consequential to perceived image quality.

As pixel sizes decrease, there may be increased crosstalk between neighboring pixels. One consequence of such crosstalk is so-called "green imbalance," in which green pixels in the same row as red pixels have different values than green pixels in the same row as blue pixels for the same illuminant level. This can result in a perceptible artifact that can degrade image quality, particularly in uniform areas of an image.

SUMMARY

A method of correcting color imbalance in a captured image includes deriving gradient data from a group of pixels in the captured image, determining a compensation value based on the gradient data, and applying the compensation value to at least one pixel in the group of pixels.

In one implementation of such a method, each pixel in the image represents a color from a set of colors, one particular color in the set of colors is a selected color, and each of the at least one pixel to which the compensation value is applied represents the selected color.

In one variant of that implementation, the selected color has, among all colors in the set of colors, the greatest visual response.

In another variant of that implementation, the applying includes applying the compensation value to all pixels of the selected color in the group of pixels.

In still another variant of that implementation, the at least one pixel is a single pixel of interest, the group of pixels is selected based on proximity to the single pixel of interest, and the applying includes applying the compensation value to only the single pixel of interest.

In another implementation of such a method, the group of pixels forms a rectangular shape, and the gradient data include a horizontal gradient and a vertical gradient.

In yet another implementation of such a method, the group of pixels is in a portion of the image, and the method further includes classifying the at least one pixel according to a visual characteristic of the portion of the image, where the determining a compensation value is based also on the visual characteristic.

In a variant of that implementation, the visual characteristic is selected from the group consisting of vertical edge, horizontal edge, busy area and non-edge area.

A method of correcting color imbalance in a captured image, where each pixel in the captured image represents a color from a set of colors, and one particular color in the set of colors is a selected color, includes, for every individual pixel in the image representing the selected color, deriving horizontal and vertical gradient data from a group of pixels surrounding the individual pixel where the group of pixels is in a portion of the image, classifying the individual pixel according to a visual characteristic of the portion of the image, determining a compensation value based on the gradient data and the visual characteristic, and applying the compensation value to the individual pixel.

An implementation of that method further includes, after carrying out the deriving, the classifying, the determining and the applying on every individual pixel in the image representing the selected color, carrying out a demosaic operation on the image.

Image processing apparatus includes a digital image processor that corrects color imbalance in an image that is output by an image detector, by deriving gradient data from a group of pixels in the image, determining a compensation value based on the gradient data, and applying the compensation value to at least one pixel in the group of pixels.

In one implementation of that apparatus, each pixel in the image represents a color from a set of colors, one particular color in the set of colors is a selected color, and each of the at least one pixel to which the compensation value is applied represents the selected color.

In a variant of that implementation, the selected color has, among all colors in the set of colors, the greatest visual response.

In another variant of that implementation, the applying comprises applying the compensation value to all pixels of the selected color in the group of pixels.

In yet another variant of that implementation, the at least one pixel is a single pixel of interest, the group of pixels is selected based on proximity to the single pixel of interest, and the applying comprises applying the compensation value to only the single pixel of interest.

In another implementation of the apparatus, the group of pixels forms a rectangular shape, and the gradient data include a horizontal gradient and a vertical gradient.

In yet another implementation of the apparatus, the group of pixels is in a portion of the image, and the digital image processor corrects color imbalance in the image, by further classifying the at least one pixel according to a visual characteristic of the portion of the image, where the determining is based also on the visual characteristic.

In a variant of that implementation, the visual characteristic is selected from the group consisting of vertical edge, horizontal edge, busy area and non-edge area.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
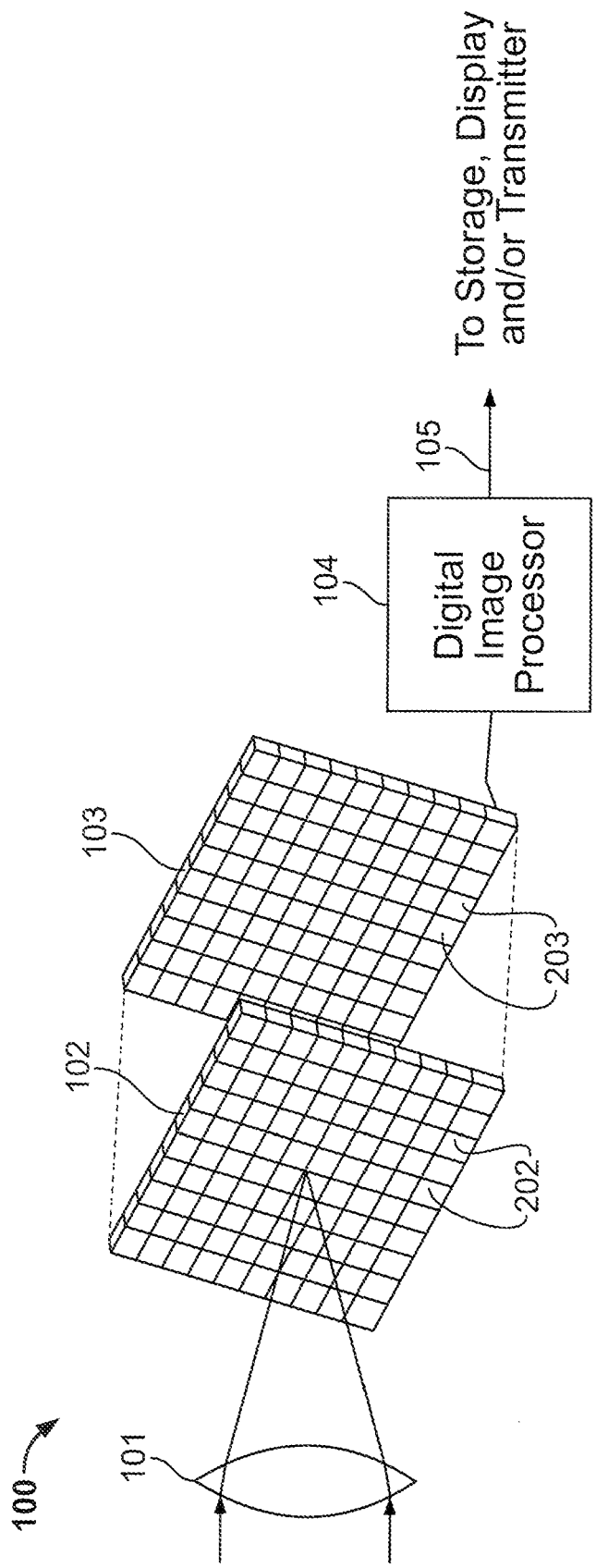
FIG. 1 is a schematic representation of a digital image capture and processing system in which subject matter of this disclosure may be implemented.

The present disclosure may be implemented in any digital image processing system. FIG. 1 shows an implementation of a digital image capture and processing system 100 which may be included in any still or moving image processing technology such as those identified above. In digital image capture and processing system 100, lens 101 focuses incoming light onto image detector 103 through color filter array 102. As noted above, image detector 103 may be a charge-coupled device or a CMOS detector. The individual color filters of color filter array 102 may be arranged in any suitable pattern, such as the Bayer CFA pattern discussed above and described below in connection with FIGS. 2 and 3.

Color filter array 102 is aligned relative to image detector 103 so that each pixel 203 of image detector 103 is illuminated by light passing through only one color filter element 202 of color filter array 102. In that way, although the pixels 203 of image detector 103 detect only luminance, each pixel of image detector 103 outputs a signal representing a single color component (e.g., red, green or blue in an RGB system).

The output of image detector 103 is processed in digital Image Signal Processor (ISP) 104, which as is well known may include any suitable combination of hardware and firmware arranged to perform the functions or methods described below. ISP 104 may be an image processing engine of the type used in digital cameras, mobile telephones or other devices. This engine can perform a range of tasks, such as denoise operations, demosaic operations, defect correction, lens shading correction, tone mapping and edge sharpening. Signal 105 output by digital ISP 104 may be stored or transmitted, for later display by a suitable display device, such as a television or computer monitor, or the screen of a mobile device (not shown).

Figure 2:
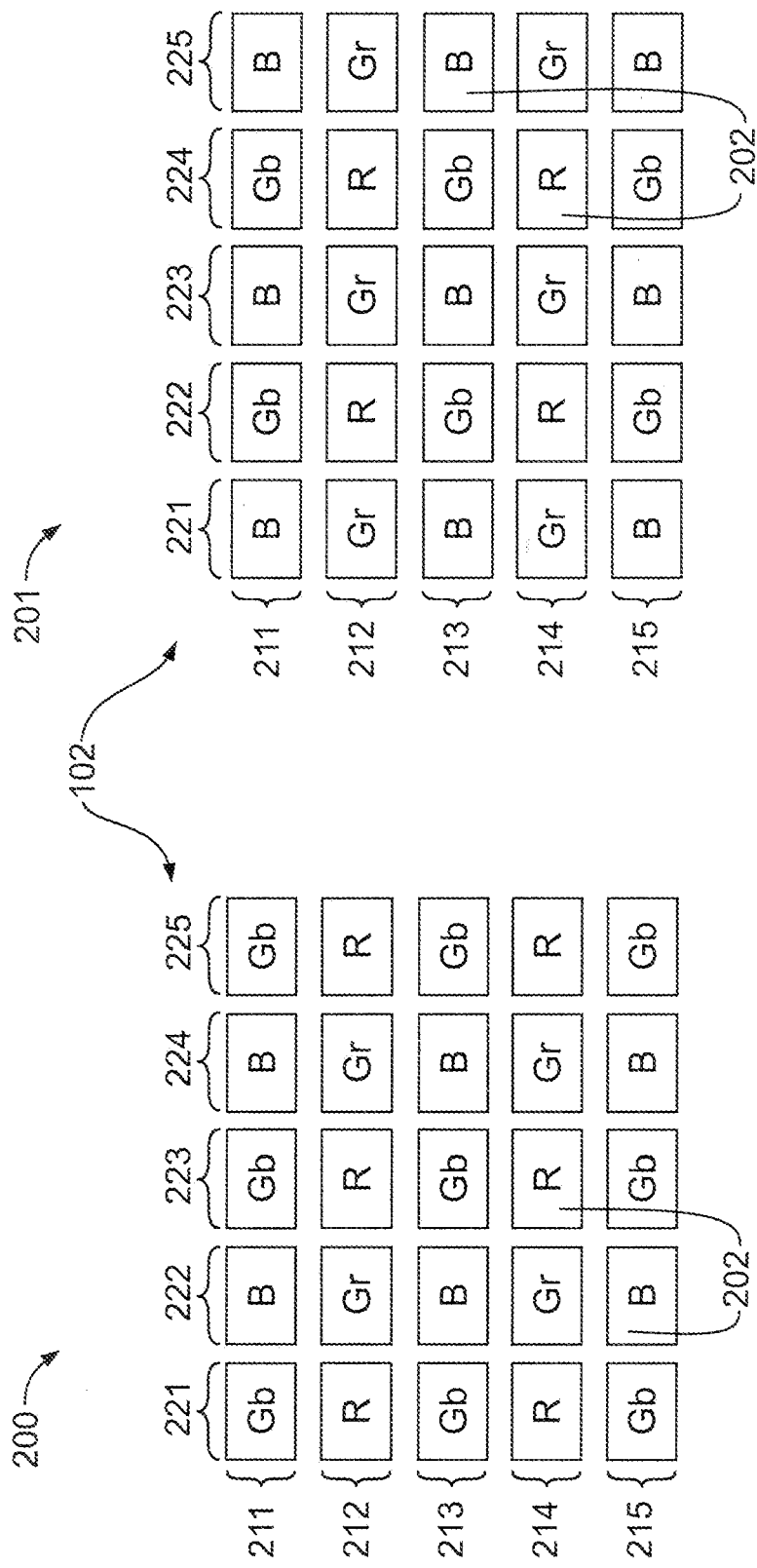
FIG. 2 is a diagram of color filter patterns as used in implementations of this disclosure.

FIG. 2 shows two different five-pixel-by-five-pixel areas 200, 201 of color filter array 102 arranged in the aforementioned Bayer CFA configuration. As can be seen, the individual pixel filters 202 are arranged in rows 211-215. Each of rows 211-215 includes green pixel filters 202 alternating with either red pixel filters 202 or blue pixel filters 202—i.e., each row includes either green and red pixel filters only, or green and blue pixel filters only. Red pixel filters 202 are identified by the letter "R"; blue pixel filters 202 are identified by the letter "B." Green pixel filters 202 that are located in rows with red pixel filters 202 are identified by the letters "Gr"; green pixel filters 202 that are located in rows with blue pixel filters 202 are identified by the letters "Gb."

The rows 211-215 are arranged so that each row of green and red pixel filters is adjacent only rows of green and blue pixel filters—i.e., no row of green and red pixel filters is adjacent another row of green and red pixel filters, and no row of green and blue pixel filters is adjacent another row of green and blue pixel filters. The rows of green and blue pixel filters are offset from the rows of green and red pixel filters so that no column including red pixel filters also includes any blue pixel filters, and no column including blue pixel filters also includes red pixel filters. The result is that, as described above, the red and blue pixels are arranged on respective rectangular lattices in their respective sets of rows, while the green pixels are located on a quincunx lattice.

Although this description is written in terms of the pixels of the color filter array, it will be understood that the pixels values discussed herein are the outputs of individual pixels of detector 103, each of which is illuminated by light that passes through a particular pixel filter 202 of color filter array 102.

According to implementations of this disclosure, an adjustment may be applied to each green pixel (whether a Gr pixel or a Gb pixel). While the adjustment may be determined once for all Gb pixels and once for all Gr pixels, or individually for each green pixel (Gb or Gr), it may be convenient to break the color filter array into individual areas or "kernels", and to process each kernel to determine an adjustment for all Gr pixels in that particular kernel and all Gb pixels in that particular kernel.

As explained in more detail below, the adjustments determined according to implementations of this disclosure may be based on the type of image area the pixels are located in. Thus, the adjustments may be different for horizontal edges, vertical edges, non-edge areas (i.e., areas with no clear edge), and "busy" areas (i.e., areas with high-contrast irregular edges).

Figure 3:
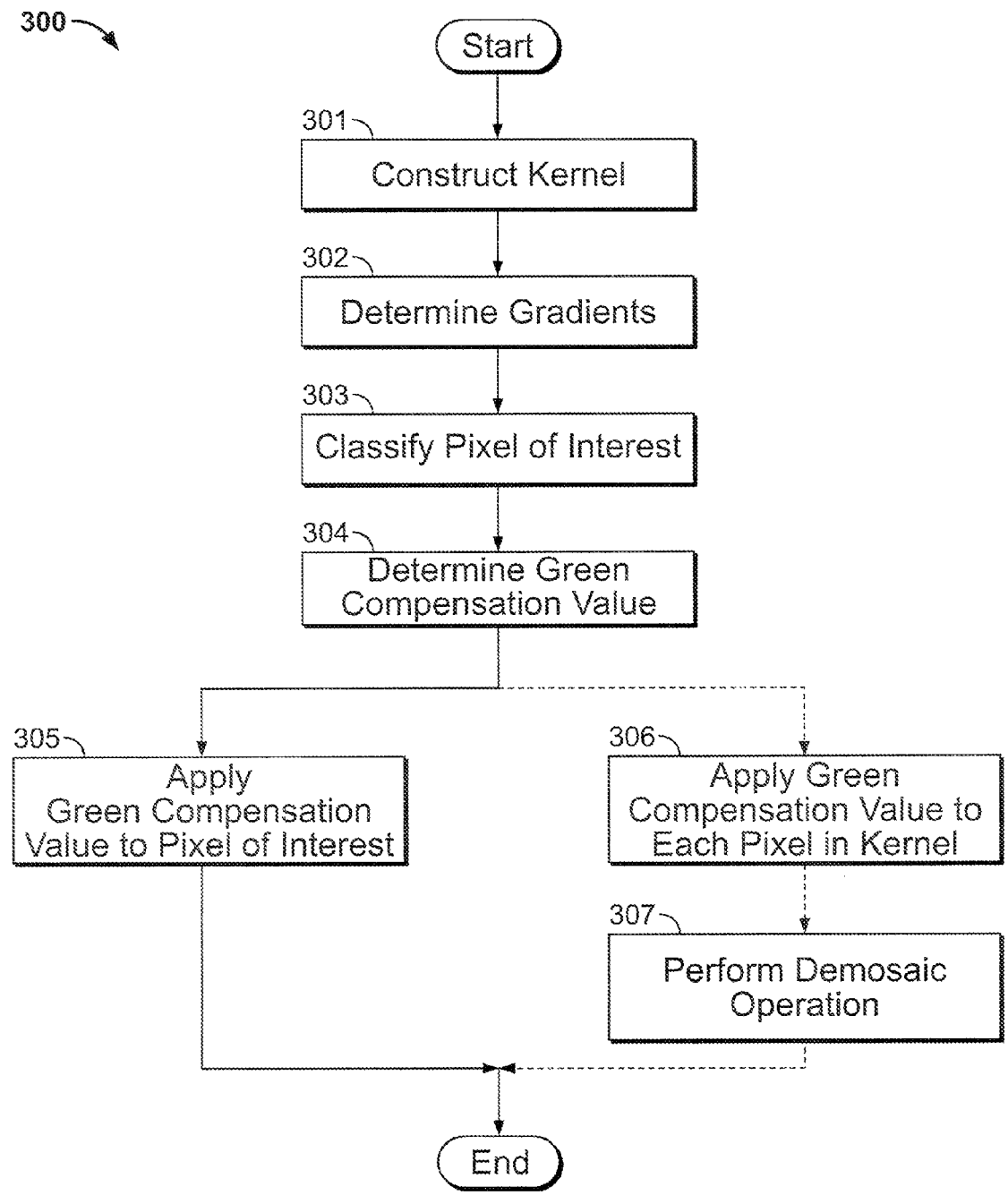
FIG. 3 is a flow diagram of an implementation of a method according to this disclosure.

A basic method 300 according to implementations of this disclosure is diagrammed in FIG. 3.

At 301, for a particular green pixel, a kernel, each of which includes a plurality of pixels, is constructed around the pixel. For example, kernel 201 may have 25 pixels arranged in five rows and five columns. At 302, horizontal gradients $Grad_{hor}^1$ and $Grad_{hor}^2$, and vertical gradients $Grad_{ver}^1$ and $Grad_{ver}^2$, are determined for the kernel. An example of gradient determination is described in more detail below. At 303, the pixel of interest—i.e., the pixel on which the kernel is centered—is classified, for example as described above, as being, on a horizontal edge, on a vertical edge, in a non-edge area, or in a busy area (although other classifications may be used). An example of pixel classification is described in more detail below. At 304, a green compensation value is determined for the pixel of interest, in part, on its classification at 302, and is applied to the pixel of interest at 305. An example of determination of green compensation value is described in more detail below.

Optionally, a demosaic operation can be carried out on the image at the time of green imbalance compensation. This option would be employed, for example, when a video signal is being processed "on-the-fly"—i.e., in real-time—for viewing or transmission (otherwise the demosaic operation may be performed later). If processing is being performed on-the-fly, then constructing a kernel around each green pixel to compute green imbalance compensation for that pixel as described above would require additional line buffering. Therefore, for on-the-fly processing the image would be broken down into kernels (some of which will resemble kernel 200 centered on a green pixel, and some of which will resemble kernel 201 centered on a non-green pixel). The green compensation value would be determined at 304 as described above for each kernel. The green compensation value derived for a particular kernel would be applied at 306 to every green pixel—whether Gb or Gr—in that kernel. A demosaic operation would then be carried out at 307. However, it will be apparent that this type of "per-kernel" processing also can be used for offline processing instead of the "per-pixel" processing described above (where a kernel is constructed around each green pixel for computation purposes), even though it might not be necessary to do so. In that case, the demosaic operation would be performed later.

Except where otherwise indicated, the discussion below assumes that no demosaic operation is intended to be carried out on the image at the time of green imbalance compensation. However, if a demosaic operation is to be carried out on the image at the time of green imbalance compensation, then any reference to the "pixel of interest" should be considered a reference to the center pixel of the kernel which, for a kernel 201, will not be green.

Continuing to use the examples of kernels resembling five-pixel-by-five-pixel areas 200, 201, gradient determination 302 may be performed as follows:

If, starting in the upper left corner of a kernel, the five rows 211-215 in each kernel are identified as i=0, . . . , 4, and the five columns 221-225 in each kernel are identified as j=0, . . . , 4, then for each pixel location (i,j), the pixel value may be denoted p[i][j]. The horizontal and vertical gradients $Grad_{hor}^1$ and $Grad_{ver}^1$, and $Grad_{hor}^2$ and $Grad_{ver}^2$, may be calculated as follows:

$$Grad_{hor}^1 = |2*p[2][2] - p[2][0] - p[2][4]| +$$
$$|p[2][1] - p[2][3]| + (|p[1][1] - p[1][3]| + |p[3][1] - p[3][3]|)/2 +$$
$$(|p[0][1] - p[0][3]| + |p[4][1] - p[4][3]|)/2 +$$
$$(|2*p[1][2] - p[1][0] - p[1][4]| + |2*p[3][2] - p[3][0] - p[3][4]|)/4$$

$$Grad_{hor}^2 = |(p[2][3] + p[2][1])/2 - (2*p[2][2] + p[2][0] + p[2][4])/4| +$$
$$|(p[3][3] + p[3][1])/4 - (2*p[3][2] + p[3][0] + p[3][4])/8|/2 +$$
$$|(p[1][3] + p[1][1])/4 - (2*p[1][2] + p[1][0] + p[1][4])/8|/4$$

$$Grad_{ver}^1 = |2*p[2][2] - p[0][2] - p[4][2]| + |p[1][2] - p[3][2]| +$$
$$(|p[1][1] - p[3][1]| + |p[1][1] - p[3][3]|)/2 +$$
$$(|p[1][1] - p[3][1]| + |p[1][1] - p[3][3]|)/2 +$$
$$(|p[1][0] - p[3][0]| + |p[1][4] - p[3][4]|)/2 +$$
$$(|2*p[2][1] - p[0][1] - p[4][1]| + |2*p[2][3] - p[0][3] - p[4][3]|)/4$$

$$Grad_{ver}^2 = |(p[3][2] + p[1][2])/2 \cdot (2*p[2][2] + p[0][2] + p[4][2])/4| +$$
$$|(p[3][3] + p[1][3])/4 - (2*p[2][3] + p[0][3] + p[4][3])/8|/2 +$$
$$|(p[3][1] + p[1][1])/4 - (2*p[2][1] + p[0][1] + p[4][1])/8|/4$$

As noted above, the goal of pixel classification 303 is to classify each pixel into one of the following classes:
1) Class VERTICAL: strong vertical edge indication.
2) Class HORIZONTAL: strong horizontal edge indication.
3) Class NONEDGE: Lack of strong edge indication.
4) Class BUSY: image content with crowded, irregular, high-contrast edges, such as text.

One possible implementation of pixel classification 303 begins with busy detection.

A counter busy_dec_num may be initialized to 0 and a threshold busy_thre may be computed as follows:

$$busy\_thre=(4*p[2][2]+p[2][1]-p[1][2]+p[2][3]+p[3][2])/16, min\_busy\_thre)$$

where min_busy_thre is determined empirically by the system designer or user to adjust more adaptively to the image brightness.

Once busy_thre has been determined, the following calculations may be carried out:
1. If (min(|p[2][2]−p[0][0]|, |p[2][2]−p[0][2]|, |p[0][0]−p[0][2]|)>busy_thre, increase busy_dec_num by 1;
2. If (min(|p[2][2]−p[0][0]|, |p[2][2]−p[2][0]|, |p[0][0]−p[2][0]|)>busy_thre, increase busy_dec_num by 1;
3. If (min(|p[2][2]−p[0][4]|, |p[2][2]−p[0][2]|, |p[0][4]−p[0][2]|)>busy_thre, increase busy_dec_num by 1;
4. If (min(|p[2][2]−p[0][4]|, |p[2][2]−p[2][4]|, |p[0][4]−p[2][4]|)>busy_thre, increase busy_dec_num by 1;
5. If (min(|p[2][2]−p[4][0]|, |p[2][2]−p[2][0]|, |p[2][0]−p[4][0]|)>busy_thre, increase busy_dec_num by 1;
6. If (min(|p[2][2]−p[4][0]|, |p[2][2]−p[4][2]|, |p[4][0]−p[4][2]|)>busy_thre, increase busy_dec_num by 1;
7. If (min(|p[2][2]−p[4][4]|, |p[2][2]−p[2][4]|, |p[2][4]−p[4][4]|)>busy_thre, increase busy_dec_num by 1;
8. If (min(|p[2][2]−p[4][4]|, |p[2][2]−p[4][2]|, |p[4][2]−p[4][4]|)>busy_thre, increase busy_dec_num by 1.

If, after these calculations, busy_dec_num>4, the pixel of interest is classified as busy. Otherwise, further classification proceeds as follows:

First, two thresholds thre_grad1, thre_grad2 for the classification of the pixel of interest as an edge pixel or a non-edge pixel are determined:

$$thre\_grad1=MAX(MIN(Grad_{hor}^1, Grad_{ver}^1)*k\_grad1/32, min\_grad\_thr)$$

$$thre\_grad2=MAX(MIN(Grad_{Hor}^2, Grad_{ver}^2)*k\_grad2/32, min\_grad\_thr)$$

where min_grad_thr, k_grad1 and k_grad2 are empirically determined by the system designer or user to adjust more adaptively to the image contrast. These thresholds are used with the gradients to perform an initial classification in which the pixel of interest is assigned two classifications—class1 and class2:

If($Grad_{hor}^1$>$Grad_{ver}^1$+thre_grad1), then
    class_1=VERTICAL;

Else if ($Grad_{ver}^1$>$Grad_{hor}^1$+thre_grad1) then
    class_1=HORIZONTAL;

Else class_1=NONEDGE;

If($Grad_{Hor}^2$>$Grad_{ver}^2$+thre_grad2), then
    class_2=VERTICAL;

Else if ($Grad_{ver}^2$>$Grad_{hor}^2$+thre_grad2), then
    class_2=HORIZONTAL;

Else class_2=NONEDGE;

A final classification, merging class1 and class2, may be performed as follows:

```
if (class__1 = VERTICAL)
{
    if (class__2=HORIZONTAL) then class__final = NONEDGE;
    else class__final = VERTICAL;
}
```

-continued

```
else if(class_1 = HORIZONTAL)
    {
        if (class_2 = VERTICAL) then class_final = NONEDGE;
        else class_final = HORIZONTAL;
    }
else
    class_final = class_2
```

It will be appreciated, that if the pixel of interest had been determined during busy detection to be in a busy area, then it would have been assigned class_final=BUSY.

After classification has been carried out, the compensation value may be determined. First, separate average values may be calculated for the Gr pixels in the kernel (AvgGr) and the Gb pixels in the kernel (AvgGb). The averages can be "fine," meaning that separate averages are determined for pixels classified with different edge directions, or "coarse," meaning that the averages are determined without regard to edge direction. The resulting averages may be denoted $AvgGb_{fine}$, $AvgGb_{coarse}$, $AvgGr_{fine}$, and $AvgGr_{coarse}$.

The determination of the averages will depend on the pixel classification.

For a pixel classified as a horizontal edge, the kernel is separated into upper and lower areas (the middle row may be used in both areas), and the "up" and "down" averages are determined separately, and are then used to determine an overall average.

In this horizontal edge case, where either the operation is being performed on a pixel basis, or the operation is being performed on a kernel basis and the center pixel of the kernel is green, the averages may be determined as follows:

$AvgGb$_up=(2*$G[0][2]$+2*$G[2][2]$+$G[0][0]$+$G[0][4]$+$G[2][0]$+$G[2][4]$)/8;

$AvgGr$_up=($G[1][1]$+$G[1][3]$)/2;

$AvgGb$_down=(2*$G[2][2]$+2*$G[4][2]$+$G[2][0]$+$G[2][4]$+$G[4][0]$+$G[4][4]$)/8;

$AvgGr$_down=($G[3][1]$+$G[3][3]$)/2;

if |$AvgGb$_up−$AvgGr$_up|<|$AvgGb$_down−$AvgGr$_down| then $AvgGr_{fine}$=$AvgGr$_up; $AvgGb_{fine}$=$AvgGb$_up else $AvgGR_{fine}$=$AvgGr$_down;
$AvgGb_{fine}$=$AvgGb$_down In this horizontal edge case, where the operation is being performed on a kernel basis and the center pixel of the kernel is not green, the averages may be determined as follows:

$AvgGb$_up=($G[2][1]$+$G[2][3]$+$G[0][1]$+$G[0][3]$)/4

$AvgGr$_up=(2*$G[1][2]$+$G[1][0]$+$G[1][4]$)/4

$AvgGb$_down=($G[2][1]$+$G[2][3]$+$G[4][1]$+$G[4][3]$)/4

$AvgGr$_down=(2*$G[3][2]$+$G[3][0]$+$G[3][4]$)/4 if |$AvgGb$_up−$AvgGR$_up|<|$AvgGb$_down−$AvgGr$_down| then $AvgGr_{fine}$=$AvgGr$_up; $AvgGb_{fine}$=$AvgGb$_up else $AvgGr_{fine}$=$AvgGr$_down;
$AvgGB_{fine}$=$AvgGB$_down For a pixel classified as a vertical edge, the kernel is separated into left and right areas (the middle column may be used in both areas), and the "left" and "right" averages are determined separately, and are then used to determine an overall average.

In this vertical edge case, where either the operation is being performed on a pixel basis, or the operation is being performed on a kernel basis and the center pixel of the kernel is green, the averages may be determined as follows:

$AvgGb$_left=(2*$G[2][0]$+2*$G[2][2]$+$G[0][0]$+$G[4][0]$+$G[0][2]$+$G[4][2]$)/8;

$AvgGr$_left=($G[1][1]$+$G[3][1]$)/2;

$AvgGb$_right=(2*$G[2][4]$+2*$G[2][2]$+$G[0][2]$+$G[4][2]$+$G[0][4]$+$G[4][4]$)/8

$AvgGr$_right=($G[1][3]$+$G[3][3]$)/2;

if |$AvgGb$_left−$AvgGR$_left|<|$AvgGB$_right−$AvgGR$_right| then $AvgGr_{fine}$=$AvgGr_{left}$; $AvgGb_{fine}$=$AvgGb$_left else $AvgGb_{fine}$$AvgGr$_right; $AvgGb_{fine}$=$AvgGb$_right In this vertical edge case, where the operation is being performed on a kernel basis and the center pixel of the kernel is not green, the averages may be determined as follows:

$AvgGb$_left=(2*$G[2][1]$+$G[0][1]$+$G[4][1]$)/4

$AvgGr$_left=($G[1][2]$+$G[3][2]$+$G[1][0]$+$G[3][0]$)/4

$AvgGb$_right=(2*$G[2][3]$+$G[0][3]$+$G[4][3]$)/4

$AvgGr$_right=($G[1][2]$+$G[3][2]$+$G[1][4]$+$G[3][4]$)/4 if |$AvgGb$_left−$AvrGr$_left|<|$AvgGb$_right−$AvgGr$_right| then $AvgGr_{fine}$=$AvgGr$_left; $AvgGb_{fine}$=$AvgGb$_left else $AvgGr_{fine}$=$AvgGr$_right; $AvgGb_{fine}$=$AvgGb$_right For a pixel that is not on an edge, and where either the operation is being performed on a pixel basis, or the operation is being performed on a kernel basis and the center pixel of the kernel is green, the averages may be determined as follows:

$AvgGr_{fine}$=$AvgGr_{coarse}$=(4*$G[2][2]$+$G[2][0]$+$G[0][2]$+$G[2][4]$+$G[4][2]$)/8

$AvgGb_{fine}$=$AvgGb_{coarse}$=($G[1][1]$+2*$G[1][3]$+$G[3][1]$+$G[3][3]$)/4

For a pixel that is not on an edge, where the operation is being performed on a kernel basis and the center pixel of the kernel is not green, the averages may be determined as follows:

$AvgGr_{fine}$=$AvgGr_{coarse}$=(2*$G[1][2]$+2*$G[3][2]$+$G[1][0]$+$G[1][4]$+$G1[3][0]$+$G[3][4]$+3)/8

$AvgGr_{fine}$=$AvgGr_{coarse}$=(2*$G[2][1]$+2*$G[2][3]$+$G[0][1]$+$G[0][3]$+$G[4][1]$+$G[4][1]$+3)/8

For a busy area, it is difficult to compute the compensation values, and in any event the imbalance may be masked by the busyness, so AvgGb and AvgGr (coarse and fine) may be set to zero.

For all areas, the coarse and fine averages may be combined as follows:

$AvgGr$=((256−smoothness_gb)*$AvgGr_{fine}$+smoothness_gb*$AvgGr_{course}$)/256

$$AvgGb = ((256 - smoothness\_gb) * AvgGb_{fine} + smoothness\_gb * AvgGb_{course})/256$$

where smoothness_gb is a system-designer- or user-determined parameter that determines the aggressiveness of the green balance, which may affect image detail.

Once the averages have been determined, an initial compensation value diff_gb$_{init}$ may be calculated as follows:

$$diff\_gb_{init} = (AvgGb - AvgGr)/2$$

However, the compensation value may be capped at maxGb$_{allow}$, where:

$$maxGb_{allow} = \min((AvgGr + AvgGb)/2) * gb\_thre)/256, maxCorV)$$

if |*diff_gb*| > max*CutV* then *diff_gb* = 0;

else

*diff_gb* = max*Gb*$_{allow}$ if *diff_gb* ≥ max*Gb*$_{allow}$ else *diff_gb* = -max*Gb*$_{allow}$ if *diff_gb* < -max*Gb*$_{allow}$ else *diff_gb* = *diff_gb*$_{init}$ maxCorV, maxCutV, and gb_thre are parameters that may be selected empirically by the system designer or user. For example, maxGb$_{allow}$ can be adjusted adaptively based on the selection of gb_thre and maxCorV. Both gb_thre and max-CorV may be varied based on sensor characteristics such as analog gain and integration time. maxCutV would add another level of protection, in that if the estimated value exceeds maxCutV, it would be known that the estimate is wrong (and should be, e.g., reset to 0).

After the compensation value has been determined, it is subtracted from each Gb pixel and added to each Gr pixel.

Where the operation is being performed on a pixel basis, or where the operation is being performed on a kernel basis and the center pixel of the kernel is green, the result is as follows:

*G*[0][0] = *G*[0][0] - *diff_gb*

*G*[0][2] = *G*[0][2] - *diff_gb*

*G*[0][4] = *G*[0][4] - *diff_gb*

*G*[2][0] = *G*[2][0] - *diff_gb*

*G*[2][2] = *G*[2][2] - *diff_gb*

*G*[2][4] = *G*[2][4] - *diff_gb*

*G*[4][0] = *G*[4][0] - *diff_gb*

*G*[4][2] = *G*[4][2] - *diff_gb*

*G*[4][4] = *G*[4][4] - *diff_gb*

*G*[1][1] = *G*[1][1] + *diff_gb*

*G*[1][3] = *G*[1][3] + *diff_gb*

*G*[3][1] = *G*[3][1] + *diff_gb*

*G*[3][3] = *G*[3][3] + *diff_gb*

Where the operation is being performed on a kernel basis and the center pixel of the kernel is NOT green, the result is as follows:

*G*[0][1] = *G*[0][1] - *diff_gb*

*G*[0][3] = *G*[0][3] - *diff_gb*

*G*[2][1] = *G*[2][1] - *diff_gb*

*G*[2][3] = *G*[2][3] - *diff_gb*

*G*[4][1] = *G*[4][1] - *diff_gb*

*G*[4][3] = *G*[4][3] - *diff_gb*

*G*[1][0] = *G*[1][0] + *diff_gb*

*G*[1][2] = *G*[1][0] + *diff_gb*

*G*[1][4] = *G*[1][0] + *diff_gb*

*G*[3][0] = *G*[1][0] + *diff_gb*

*G*[3][2] = *G*[1][0] + *diff_gb*

*G*[3][4] = *G*[1][0] + *diff_gb*

The foregoing methods may be carried out by digital image processor 104 (FIG. 1). Digital image processor 104 may be hard-wired to perform the methods, and may include firmware and appropriate microcode to perform the methods, or digital image processor 104 may include a general-purpose or specialized processor that can execute software to perform the methods.

Although the foregoing implementation has been described in the context of an RGB color model, this disclosure may be applicable to other color models where the spectral response of one of the native colors of the model is closer than others of the native colors to the luminance response of human visual system. For example, in a CMYK or RGBY color model, yellow may be treated in a manner similar to green in the foregoing implementation.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of correcting color imbalance in a captured image, the method comprising:
    deriving gradient data from a group of pixels in a portion of the captured image;
    classifying the at least one pixel according to a visual characteristic of the portion of the captured image, wherein the visual characteristic is selected from the group consisting of vertical edge, horizontal edge, busy area and non-edge area;
    determining a compensation value based on the gradient data and also on the visual characteristic; and
    applying the compensation value to at least one pixel in the group of pixels.

2. The method of claim 1 wherein:
    each pixel in the captured image represents a color from a set of colors;
    one particular color in the set of colors is a selected color; and
    each of the at least one pixel to which the compensation value is applied represents the selected color.

3. The method of claim 2 wherein the selected color has, among all colors in the set of colors, the greatest visual response.

4. The method of claim 3 wherein:
    the set of colors is red-green-blue; and
    the selected color is green.

5. The method of claim 2 wherein the applying comprises applying the compensation value to all pixels of the selected color in the group of pixels.

6. The method of claim 2 wherein:
the at least one pixel is a single pixel of interest;
the group of pixels is selected based on proximity to the single pixel of interest; and
the applying comprises applying the compensation value to only the single pixel of interest.

7. The method of claim 1 wherein:
the group of pixels forms a rectangular shape; and
the gradient data comprise a horizontal gradient and a vertical gradient.

8. A method of correcting color imbalance in a captured image, wherein:
each pixel in the captured image represents a color from a set of colors; and
one particular color in the set of colors is a selected color;
the method comprising, for every individual pixel in the captured image representing the selected color:
deriving horizontal and vertical gradient data from a group of pixels surrounding the individual pixel, the group of pixels being in a portion of the captured image;
classifying the individual pixel according to a visual characteristic of the portion of the captured image, wherein the visual characteristic is selected from the group consisting of vertical edge, horizontal edge, busy area and non-edge area;
determining a compensation value based on the gradient data and the visual characteristic; and
applying the compensation value to the individual pixel.

9. The method of claim 8 further comprising, after carrying out the deriving, the classifying, the determining and the applying on every individual pixel in the captured image representing the selected color, carrying out a demosaic operation on the captured image.

10. Image processing apparatus comprising:
a digital image processor that corrects color imbalance in an image that is output by an image detector, by:
deriving gradient data from a group of pixels in a portion of the image,
classifying the at least one pixel according to a visual characteristic of the portion of the image, wherein the visual characteristic is selected from the group consisting of vertical edge, horizontal edge, busy area and non-edge area,
determining a compensation value based on the gradient data and also on the visual characteristic, and
applying the compensation value to at least one pixel in the group of pixels.

11. The apparatus of claim 10 wherein:
each pixel in the image represents a color from a set of colors;
one particular color in the set of colors is a selected color; and
each of the at least one pixel to which the compensation value is applied represents the selected color.

12. The apparatus of claim 11 wherein the selected color has, among all colors in the set of colors, the greatest visual response.

13. The apparatus of claim 12 wherein:
the set of colors is red-green-blue; and
the selected color is green.

14. The apparatus of claim 11 wherein the applying comprises applying the compensation value to all pixels of the selected color in the group of pixels.

15. The apparatus of claim 11 wherein:
the at least one pixel is a single pixel of interest;
the group of pixels is selected based on proximity to the single pixel of interest; and
the applying comprises applying the compensation value to only the single pixel of interest.

16. The apparatus of claim 14 wherein:
the group of pixels forms a rectangular shape; and
the gradient data comprise a horizontal gradient and a vertical gradient.

* * * * *